United States Patent
Megahed et al.

(10) Patent No.: US 11,074,529 B2
(45) Date of Patent: Jul. 27, 2021

(54) PREDICTING EVENT TYPES AND TIME INTERVALS FOR PROJECTS

(71) Applicant: International Business Machines Corporation, Armonk, NY (US)

(72) Inventors: Aly S. Megahed, San Jose, CA (US); Hamid R. Motahari Nezhad, San Jose, CA (US); Peifeng Yin, State College, PA (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 14/960,242

(22) Filed: Dec. 4, 2015

(65) Prior Publication Data

US 2017/0161660 A1    Jun. 8, 2017

(51) Int. Cl.
*G06Q 10/06* (2012.01)
*G06Q 10/10* (2012.01)
*G06F 17/18* (2006.01)

(52) U.S. Cl.
CPC ....... *G06Q 10/06313* (2013.01); *G06F 17/18* (2013.01); *G06Q 10/103* (2013.01)

(58) Field of Classification Search
None
See application file for complete search history.

(56) References Cited

U.S. PATENT DOCUMENTS

| | | |
|---|---|---|
| 6,195,646 B1 | 2/2001 | Grosh et al. |
| 6,963,854 B1 | 11/2005 | Boyd et al. |
| 7,010,494 B2 | 3/2006 | Etzioni et al. |

(Continued)

FOREIGN PATENT DOCUMENTS

| | | |
|---|---|---|
| WO | 2012016439 A1 | 2/2012 |
| WO | 2014014470 A1 | 1/2014 |
| WO | 2014060226 A1 | 4/2014 |

OTHER PUBLICATIONS

Matthew Malensek, et al. Using Distributed Analytics to Enable Real-Time Exploration of Discrete Event Simulations, 2014, IEEE/ACM 7th International Conference on Utility and Cloud Computing (Year: 2014).*

(Continued)

*Primary Examiner* — Jerry O'Connor
*Assistant Examiner* — Matthew H Divelbiss
(74) *Attorney, Agent, or Firm* — Sherman IP LLP; Kenneth L. Sherman; Hemavathy Perumal

(57) ABSTRACT

One embodiment provides a method comprising mapping project attributes for past projects to a first parameter set associated with a first model that models distribution of event types of project events, and a second parameter set associated with a second model that models distribution of the time intervals of project events. Specifically, machine learning is applied to a set of historical data for the past projects to obtain a first and a second set of learned weights. The method further comprises predicting information relating to a next project event for an ongoing project by generating a first probability distribution for a set of possible event types for the next project event utilizing the first model, and, for each possible event type, generating a corresponding probability distribution for time intervals of occurrence of the possible event type utilizing the first model and the second model in a pipelined fashion.

20 Claims, 7 Drawing Sheets

(56) References Cited

U.S. PATENT DOCUMENTS

| | | | |
|---|---|---|---|
| 7,039,559 B2 | 5/2006 | Froehlich et al. | |
| 7,139,733 B2 | 11/2006 | Cao et al. | |
| 7,324,969 B2 | 1/2008 | Pallister et al. | |
| 7,571,120 B2 | 8/2009 | Fellenstein et al. | |
| 7,610,233 B1 | 10/2009 | Leong et al. | |
| 7,711,747 B2 | 5/2010 | Renders et al. | |
| 7,853,473 B2 | 12/2010 | Davis et al. | |
| 7,865,384 B2 | 1/2011 | Anderson et al. | |
| 7,870,047 B2 | 1/2011 | Mojsilovic et al. | |
| 7,877,293 B2 | 1/2011 | Biebesheimer et al. | |
| 7,937,304 B2 | 5/2011 | Melnicoff et al. | |
| 7,953,646 B2 | 5/2011 | Pallister et al. | |
| 8,055,530 B2 | 11/2011 | Cao et al. | |
| 8,352,355 B2 | 1/2013 | Ettl et al. | |
| 8,584,135 B2 | 11/2013 | Boss et al. | |
| 8,676,981 B2 | 3/2014 | Hackett et al. | |
| 8,781,989 B2 | 7/2014 | Duchon | |
| 8,892,625 B2 | 11/2014 | Liang et al. | |
| 9,041,797 B2 | 5/2015 | Shaffer et al. | |
| 9,124,601 B2 | 9/2015 | Stoica et al. | |
| 9,129,299 B1 | 9/2015 | Donohue et al. | |
| 9,286,391 B1 | 3/2016 | Dykstra | |
| 9,619,583 B2 | 4/2017 | Lau et al. | |
| 9,646,066 B2 | 5/2017 | Olsen et al. | |
| 9,652,776 B2 | 5/2017 | Olsen et al. | |
| 9,659,317 B2 | 5/2017 | Naghmouchi et al. | |
| 9,672,074 B2 | 6/2017 | Gaurav et al. | |
| 9,755,988 B2 | 9/2017 | Arnette et al. | |
| 9,779,407 B2 | 10/2017 | Adjaoute | |
| 10,095,990 B2 | 10/2018 | Farooq et al. | |
| 2003/0130861 A1 | 7/2003 | Seitz | |
| 2003/0220773 A1 | 11/2003 | Haas et al. | |
| 2004/0167789 A1 | 8/2004 | Roberts et al. | |
| 2004/0267676 A1 | 12/2004 | Feng et al. | |
| 2005/0071182 A1 | 3/2005 | Aikens et al. | |
| 2005/0131754 A1 | 6/2005 | Chapman et al. | |
| 2005/0189415 A1 | 9/2005 | Fano et al. | |
| 2005/0278202 A1 | 12/2005 | Broomhall et al. | |
| 2006/0089866 A1 | 4/2006 | Cheng et al. | |
| 2006/0111973 A1 | 5/2006 | Brown et al. | |
| 2006/0129879 A1 | 6/2006 | Alznauer et al. | |
| 2007/0143171 A1 | 6/2007 | Boyd et al. | |
| 2008/0167928 A1 | 7/2008 | Cao et al. | |
| 2008/0313596 A1* | 12/2008 | Kreamer | G06Q 10/06 717/101 |
| 2009/0012800 A1 | 1/2009 | Devarakonda et al. | |
| 2009/0030829 A1 | 1/2009 | Chatter et al. | |
| 2009/0240517 A1 | 9/2009 | Pelter et al. | |
| 2010/0235294 A1 | 9/2010 | Raghupathy et al. | |
| 2010/0250296 A1 | 9/2010 | Channabasavaiah et al. | |
| 2010/0262509 A1 | 10/2010 | Delia et al. | |
| 2010/0262548 A1 | 10/2010 | Herbst et al. | |
| 2011/0004509 A1 | 1/2011 | Wu et al. | |
| 2011/0066466 A1 | 3/2011 | Narayanan | |
| 2011/0218865 A1 | 9/2011 | Muthukrishnan et al. | |
| 2011/0238477 A1 | 9/2011 | Urbankski | |
| 2012/0029974 A1 | 2/2012 | Councill et al. | |
| 2012/0030199 A1 | 2/2012 | Mohajer | |
| 2012/0059674 A1 | 3/2012 | Guthrie et al. | |
| 2012/0059707 A1 | 3/2012 | Goenka et al. | |
| 2012/0072251 A1* | 3/2012 | Mircean | G06Q 10/103 705/7.11 |
| 2012/0232948 A1 | 9/2012 | Wolf et al. | |
| 2012/0290347 A1 | 11/2012 | Elazouni et al. | |
| 2012/0303491 A1 | 11/2012 | Hill et al. | |
| 2012/0317050 A1 | 12/2012 | Bermuth | |
| 2013/0054296 A1 | 2/2013 | Gajakosh et al. | |
| 2013/0166355 A1 | 6/2013 | Mohanty et al. | |
| 2013/0197993 A1 | 8/2013 | Gao et al. | |
| 2013/0218625 A1 | 8/2013 | Duquette et al. | |
| 2013/0246213 A1 | 9/2013 | Lee et al. | |
| 2013/0275085 A1 | 10/2013 | Cheng et al. | |
| 2013/0275181 A1 | 10/2013 | DiGioacchino et al. | |
| 2013/0297412 A1 | 11/2013 | Batra et al. | |
| 2013/0332243 A1 | 12/2013 | Gifford et al. | |
| 2014/0006044 A1 | 1/2014 | Pradhan et al. | |
| 2014/0052492 A1 | 2/2014 | Boss et al. | |
| 2014/0096140 A1 | 4/2014 | Aquino et al. | |
| 2014/0096249 A1 | 4/2014 | Dupont et al. | |
| 2014/0200999 A1 | 7/2014 | Canny et al. | |
| 2014/0222473 A1 | 8/2014 | Patel et al. | |
| 2014/0278808 A1 | 9/2014 | Iyoob et al. | |
| 2014/0310065 A1 | 10/2014 | Chowdhary et al. | |
| 2014/0337264 A1* | 11/2014 | Bart | G06N 5/022 706/46 |
| 2015/0066598 A1 | 3/2015 | Branch et al. | |
| 2015/0100384 A1 | 4/2015 | Ettl et al. | |
| 2015/0193709 A1 | 7/2015 | Ramesh Babu | |
| 2016/0140789 A1 | 5/2016 | Wickersham, III et al. | |
| 2016/0148227 A1 | 5/2016 | Choe et al. | |
| 2016/0203506 A1 | 7/2016 | Butler, IV et al. | |
| 2016/0217384 A1* | 7/2016 | Leonard | G06F 17/18 |
| 2016/0321331 A1 | 11/2016 | Uchiumi et al. | |
| 2017/0004408 A1 | 1/2017 | Edelen et al. | |
| 2017/0103451 A1 | 4/2017 | Alipov et al. | |
| 2018/0144314 A1 | 5/2018 | Miller | |
| 2019/0019148 A1 | 1/2019 | Kumar et al. | |

OTHER PUBLICATIONS

Suri, P.K. et al., "Estimating the Probability of Project Completion by SIM_DEL Estimator", Proceedings of the International Journal of Computer Science and Information Technologies (IJCSIT), Aug. 2012, pp. 4938-4945, vol. 3(4), ISSN: 0975-9646, United States.

Carman, S. et al., "Predictive Value of Comments in the Service Engagement Process", Proceedings of the American Society for Information Science and Technology (ASIST), 2012, pp. 1-12, vol. 49, United States.

Greenia, D.B. et al., "A Win Prediction Model for IT Outsourcing Bids", Proceedings of the SRII Global Conference, Apr. 2014, pp. 1-5, ResearchGate, United States.

Motahari Nezhad, H.R. et al., "Health identification and outcome prediction for outsourcing services based on textual comments", Proceedings of 2014 IEEE International Conference on Services Computing (SCC), Jun. 27, 2014-Jul. 2, 2014, pp. 155-162, IEEE, United States.

Yan, J. et al., "On Machine Learning towards Predictive Sales Pipeline Analytics", Proceedings of the 29th AAAI Conference on Artificial Intelligence, 2015, pp. 1945-1951, United States.

Anonymous, "Method and System for Providing a Proactive Backup for Value-Added Information Technology (IT) Service Delivery Requirements", Dec. 2, 2014, pp. 1-5, IP.com, United States.

Anonymous, "Methods and Systems for Adaptive Management and Dynamic Pricing of Information Technology Services", Feb. 25, 2013, pp. 1-4, IP.com, United States.

Anonymous, "Dynamic pricing of web services", Jun. 18, 2012, pp. 1-4, IP.com, United States.

Greenia, D.B. et al., "A Win Prediction Model for IT Outsourcing Bids", Service Research and Innovation Institute Global Conference, Apr. 2014, pp. 1-5, ResearchGate, United States.

Akkiraju, R. et al., "On Pricing Complex IT Service Solutions", Proceedings of the 2014 Annual SRII Global Conference (SRII '14), Apr. 23, 2014, pp. 55-64, IEEE Computer Society, United States.

Agarwal, D. et al., "fLDA: Matrix Factorization through Latent Dirichlet Allocation", Proceedings of the 3rd ACM International Conference on Web Search and Data Mining (WSDM'10), Feb. 4, 2010, pp. 91-100, ACM, United States.

Lee, H. et al., "Enterprise Architecture Content Model Applied to Complexity Management while Delivering IT Services", Proceedings of the 2014 IEEE International Conference on Services Computing (SCC), Jun. 27, 2014-Jul. 2, 2014, pp. 408-415, IEEE, United States.

Megahed, A. et al., "Pricing IT Services Deals: A More Agile Top-Down Approach", for publication in Nov. 2015 at 2015 ICSOC Conference, pp. 1-4, Goa, India.

List of IBM Patents or Patent Applications Treated as Related Form.

IBM, "Auto-Configuring Clusters Through Presence Based Discovery," ip.com, Feb. 6, 2007, pp. 1-3, United States.

(56) References Cited

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

PR Newswire, "EDS Signs Contract With United AirHnes to Upgrade Computer Systems and Service to Reduce IT Costs," Jan. 17, 2006, pp. 1-2, Electronic Data Systems Corporation, United States.

Business Wire, "DataDirect Technologies Helps Subaru Reduce IT Support Costs and Improve Customer Service," Nov. 2001, pp. 1-2, Rockville, United States.

Rai, V.K., et al., "A Systemic and Relational Approach to Pricing Services," Service Science, Mar. 2016, pp. 37-58, vol. 8, No. 1, Institute for Operations Research and the Management Sciences (INFORMS), Maryland, United States.

Gaivoronski, A.A., et al., "Risk-Balanced Dimensioning and Pricing of End-to-End Differentiated Services," European Journal of Operational Research, 2016, pp. 644-655, vol. 254, No. 2, Elsevier B.V., Netherlands.

Gajananan, K., et al., "A Method for Estimating Annual Unit Cost Reduction of IT Service Deals", Submitted for Publication at the 50th Hawaii International Conference on System Sciences (HICCS), 2017, pp. 1-9, United States.

Megahed, A., et al., "Top-Down Pricing of IT Services Deals with Recommendation for Missing Values of Historical and Market Data", Submitted for Publication at the 14th International Conference on Service Oriented Computing (ICSOS), 2016, pp. 1-15, United States.

Gajananan, K., et al., "A Top-Down Pricing Algorithm for IT Service Contracts Using Lower Level Service Data", In Proceedings of the 13th IEEE International Conference on Services Computing (SCC), Jun. 2016, pp. 720-727, IEEE, United States.

Megahed, A., et al., "Modeling Business Insights into Predictive Analytics for the Outcome of IT Service Contracts", In Proceedings of the 12th IEEE International Conference on Services Computing (SCC), Jun. 2015, pp. 515-521, IEEE, United States [Abstract Only].

Anonymous, "Method for Cloud and Cloud-Service Selection", ip.com, May 13, 2011, pp. 1-8, United States.

EIC 3600 Search Report dated Jul. 16, 2018 for U.S. Appl. No. 15/192,892 from Scientific and Technical Center, pp. 1-21, United States.

EIC 3600 Search Report dated Jul. 24, 2018 for U.S. Appl. No. 15/192,892 from Scientific and Technical Information Center, pp. 1-10, United States.

Bussey, P. et al., "Bid Pricing—Calculating the Possiblity of Winning", IEEE International Conference on Systems, Man, and Cybernetics. Computational Cybernetics and Simulation, Oct. 12, 1997, vol. 4, pp. 3615-3620, IEEE, United Kingdom.

List of IBM Patents or Patent Applications Treated as Related Form; Firth, M.K., U.S. Appl. No. 16/224,595, filed Dec. 18, 2018.

Lakoff, G., et al. "Metaphors We Live By," 1980, pp. ix-55, University of Chicago Press, Chicago, United States.

Edelman, S., "Computing the Mind," 2008, pp. xi-36, Oxford University Press, New York, United States.

Murphy, K.P., "Machine Learning, A Probabilistic Perspective," 2012, pp. 947-956, MIT Press, United States [Abstract Only].

Goffman, E., "Frame Analysis: An Essay on the Organization of Experience," 1974, pp. 1-39, 301-344, Northeastern Univesity Press, United States [Abstract Only].

Soni, A. et al., "Pricing schemes in cloud computing: a review", International Journal of Advanced Computer Research, Mar. 1, 2017, vol. 7, No. 29, pp. 60-70, United States.

Bardsiri, V.K. et al., "Increasing the accuracy of software development effort estimation using projects clustering", IET softward, vol. 6, No. 6, Dec. 1, 2012, pp. 461-473.

EIC 3600 Search Report dated Mar. 31, 2020 for U.S. Appl. No. 16/224,595 from Scientific and Technical Information Center, pp. 1-38, United States.

Van Dam, K.H. et al., eds. "Agent-based modelling of socio technical systems", Science & Business Media, Oct. 8, 2012, vol. 9, Springer.

Grier, D.A., "When computers were human", Princeton University Press, Nov. 1, 2013.

Hayles, N.K., "My mother was a computer: Digital subjects and literary texts" University of Chicago Press, Mar. 15, 2010.

Treffert, D.A. et al., "Islands of genius", Scientific American, vol. 286, No. 6, pp. 76-85, Jun. 1, 2002.

Mindell, D.A. et al., "Our robots, ourselves: Robotics and the muths of autonomy", Viking Adult, 2015.

List of IBM Patents or Patent Applications Treated as Related Form; Fukuda, M. U.S. Appl. No. 15/192,875, filed Jun. 24, 2016; Firth, M.K., U.S. Appl. No. 15/192,892, filed Jun. 24, 2016; Firth, M.K., U.S. Appl. No. 16/224,595, filed Dec. 18, 2018; Fukuda, M.A., U.S. Appl. No. 17/153,076, filed Jan. 20, 2021; Fukuda, M., U.S. Appl. No. 14/977,383, filed Dec. 21, 2015 List of IBM Patents or Patent Application Treated as Related From; Fukuda, M., U.S. Appl. No. 15/192,884, filed Jun. 24, 2016; Asthana, S., U.S. Appl. No. 15/860,192, filed Jan. 2, 2018, Asthana, S., U.S. Appl. No. 15/860,213, filed: Jan. 2, 2018.

Akkiraju, R. et al., "On the Role of Analytics in Estimating the Cost of Delivering Complex Information Technology (IT) Outsourcing Services Projects", 2021 Annual SRII Global Conference, Jul. 2012, pp. 705-714, United States.

Kansal et al., "Pricing Models in Cloud Computing", Proceedings of the 2014 International Conference on Information and Communication Technology for Competitive Strategies, Oct. 2014, Art. No. 33, pp. 1-5, United States.

Ming, W. et al., "Dynamic Instance Provisioning Strategy in an Iass Cloud", Proceedings of the 32nd Chinese Contol Conference, Jul. 26-28, 2013, pp. 6670-6675, IEEE.

* cited by examiner

600

```
Map Project Attributes for Past Projects to a First Parameter Set Associated With a
First Model That Models Distribution of Event Types of Project Events, and a        — 601
Second Parameter Set Associated With a Second Model That Models Distribution
of Time Intervals of Project Events by Applying Machine Learning to a Set of
Historical Data for the Past Projects to Obtain a First Set of Learned Weights and a
Second Set of Learned Weights
```

↓

```
Compute the First Parameter Set Based on Project Attributes for an Ongoing     — 602
Project and the First Set of Learned Weights
```

↓

```
Based on the First Model and the First Parameter Set, Predict an Event Type of a
Next Project Event for the Ongoing Project As a Probability Distribution for a Set of   — 603
Possible Event Types for the Next Project Event
```

↓

```
Compute the Second Parameter Set Based on the Project Attributes for the       — 604
Ongoing Project and the Second Set of Learned Weights
```

↓

```
Based on the Second Model and the Second Parameter Set, Estimating a Time
Interval of Occurrence of the Next Project Event As Probability Distributions for   — 605
Time Intervals of Occurrence of the Set of Possible Event Types
```

FIG. 6

PREDICTING EVENT TYPES AND TIME INTERVALS FOR PROJECTS

The present invention generally relates to predictive analytics models, and more particularly, to a time-aware predictive analytics model for predicting the occurrence, time and type of key events and milestones within an ongoing project to assist in monitoring the progress of the project.

BACKGROUND

A project may have interim milestones and/or key events that must occur to achieve a desired final outcome at the conclusion of the project. Projects may have different final outcomes. For example, a project concludes as a success if the final outcome of the project is a successful outcome; by contrast, a project concludes as a failure if the final outcome of the project is an unsuccessful outcome. Monitoring the status of ongoing projects is important to improve the success rate of projects. During a project, numerous interim milestones and/or key events may occur whose occurrence, and monitoring the status of the project is important in achieving a desired final outcome. Existing predictive analytics models are focused on predicting the final outcome of a project (e.g., success or failure) based on a snapshot of data relating to the project. While predicting the final outcome of a project indirectly advises on the status of the project, existing approaches offer limited guidance and insights.

For example, providers (e.g., IT service providers) sell services and/or products by pursuing opportunity engagements (e.g., sales opportunities in IT service engagements) with potential clients. A large IT outsourcing deal may be a time-consuming and elaborate process that requires multiple time-sensitive goals and milestones (e.g., proposal presentation, agreement on price and service delivery, etc.) to be achieved during the lifecycle of the deal to steer the deal toward success. These interim goals and milestones may occur at different time intervals during the lifecycle of the deal, depending on the size of the deal and other parameters. Existing predictive analytics models do not consider interim goals and milestones, and do not predict the outcome and timeline of the interim goals and milestones. Further, existing predictive analytics models do not provide estimates of when key events (e.g., a win or loss) may occur. As existing predictive analytics models do not provide guidance and insights with regards to these interim goals and milestones, there is a need to provide analytical insights about interim goals and milestones as well as the timeframe within which these interim goals and milestones may happen.

SUMMARY

One embodiment provides a method comprising mapping project attributes for past projects to a first parameter set associated with a first model that models distribution of event types of project events, and a second parameter set associated with a second model that models distribution of the time intervals of project events. Specifically, machine learning is applied to a set of historical data for the past projects to obtain a first set of learned weights and a second set of learned weights. The first set of learned weights is a result of the mapping of the project attributes to the first parameter set. The second set of learned weights is a result of the mapping of the project attributes to the second parameter set. The method further comprises predicting information relating to a next project event for an ongoing project by generating a first probability distribution for a set of possible event types for the next project event utilizing the first model, and, for each possible event type, generating a corresponding probability distribution for time intervals of occurrence of the possible event type utilizing the first model and the second model in a pipelined fashion.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 6 illustrates a flowchart of an example process for predicting occurrence, time and type of key events and milestones within an ongoing project to assist in monitoring the progress of the project, in accordance with an embodiment of the present invention.

Figure 1:
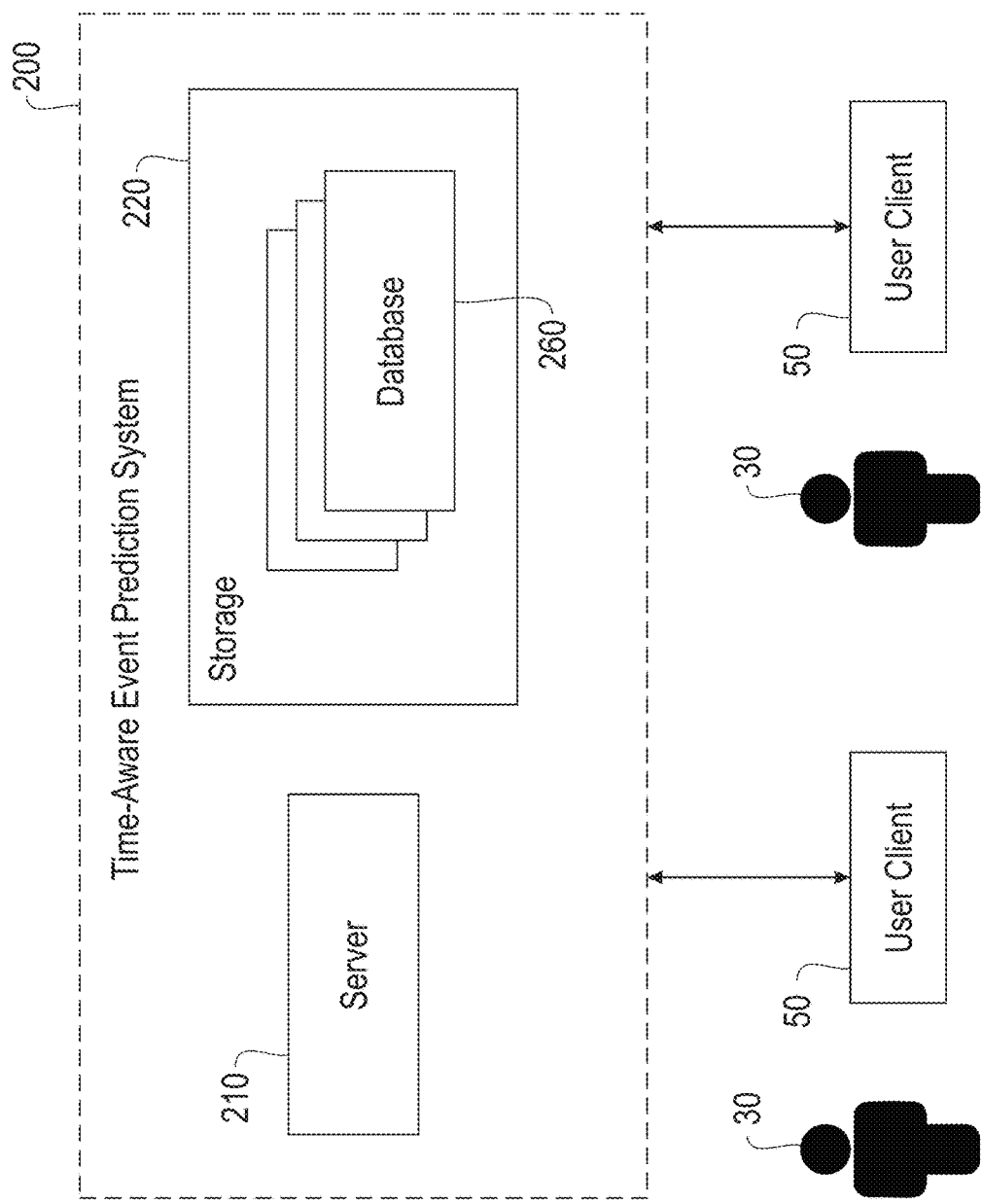
FIG. 1 illustrates an example time-aware event prediction system, in accordance with an embodiment of the invention.

The detailed description explains the preferred embodiments of the invention, together with advantages and features, by way of example with reference to the drawings.

DETAILED DESCRIPTION

The present invention generally relates to predictive models, and more particularly, to a predictive model for predicting the occurrence, time and type of key events and milestones within an ongoing project to assist in monitoring the progress of the project. One embodiment provides a method comprising mapping project attributes for past projects to a first parameter set associated with a first model that models distribution of event types of project events, and a second parameter set associated with a second model that models distribution of the time intervals of project events. Specifically, machine learning is applied to a set of historical data for the past projects to obtain a first set of learned weights and a second set of learned weights. The first set of learned weights is a result of the mapping of the project attributes to the first parameter set. The second set of learned weights is a result of the mapping of the project attributes to the second parameter set. The method further comprises predicting information relating to a next project event for an ongoing project by generating a first probability distribution for a set of possible event types for the next project event utilizing the first model, and, for each possible event type, generating a corresponding probability distribution for time intervals of occurrence of the possible event type utilizing the first model and the second model in a pipelined fashion.

Embodiments of the invention provide a time-aware predictive analytics model that enables prediction of timeline and status of one or more next project events in a project based on current history of milestone activity in a lifecycle of the project. The time-aware predictive analytics model may also be used to monitor the progress/status of a project. In one embodiment, the time-aware predictive analytics model may automatically learn a reasonable plan from historical data by determining a normal speed of attaining a successful outcome and identifying patterns representing progress, and predict a reasonable time interval and interim milestones, without pre-defined plans or pre-defined check routines. By providing analytical insights about interim goals and milestones as well as the timeframe within which these interim goals and milestones may happen, team members of the project (e.g., sales teams) may have a higher chance of success by knowing of upcoming events, and preparing to counter undesired events.

Embodiments of the invention are applicable to different projects in different areas, such as business revenue forecasting that requires identifying deals that will close with a successful outcome (i.e., win) before quarter-end, project progress monitoring, online dating advisor, etc. For example, one embodiment provides a time-aware predictive analytics model that enables prediction of timeline and status of one or more next project events in an IT outsourcing deal based on current history of milestone activity in a lifecycle of the deal.

FIG. 1 illustrates an example time-aware event prediction system 200, in accordance with an embodiment of the invention. The system 200 comprises one or more server devices 210, and one or more storage devices 220. The storage devices 220 may maintain one or more databases 260. As described in detail later herein, one or more application units may execute/operate on the server devices 210 to provide a time-aware predictive analytics model for predicting the occurrence, time and type of key events and milestones within projects and assist in monitoring the progress of ongoing projects.

A user client 30 (e.g., a member of a sales team for an ongoing deal) may access the system 200 using an electronic user client device 50, such as a personal computer, or a mobile device (e.g., a laptop computer, a tablet, a mobile phone, etc.). In one embodiment, each user client device 50 exchanges data with the system 200 over a connection (e.g., a wireless connection, a wired connection, or a combination of the two).

Figure 2:
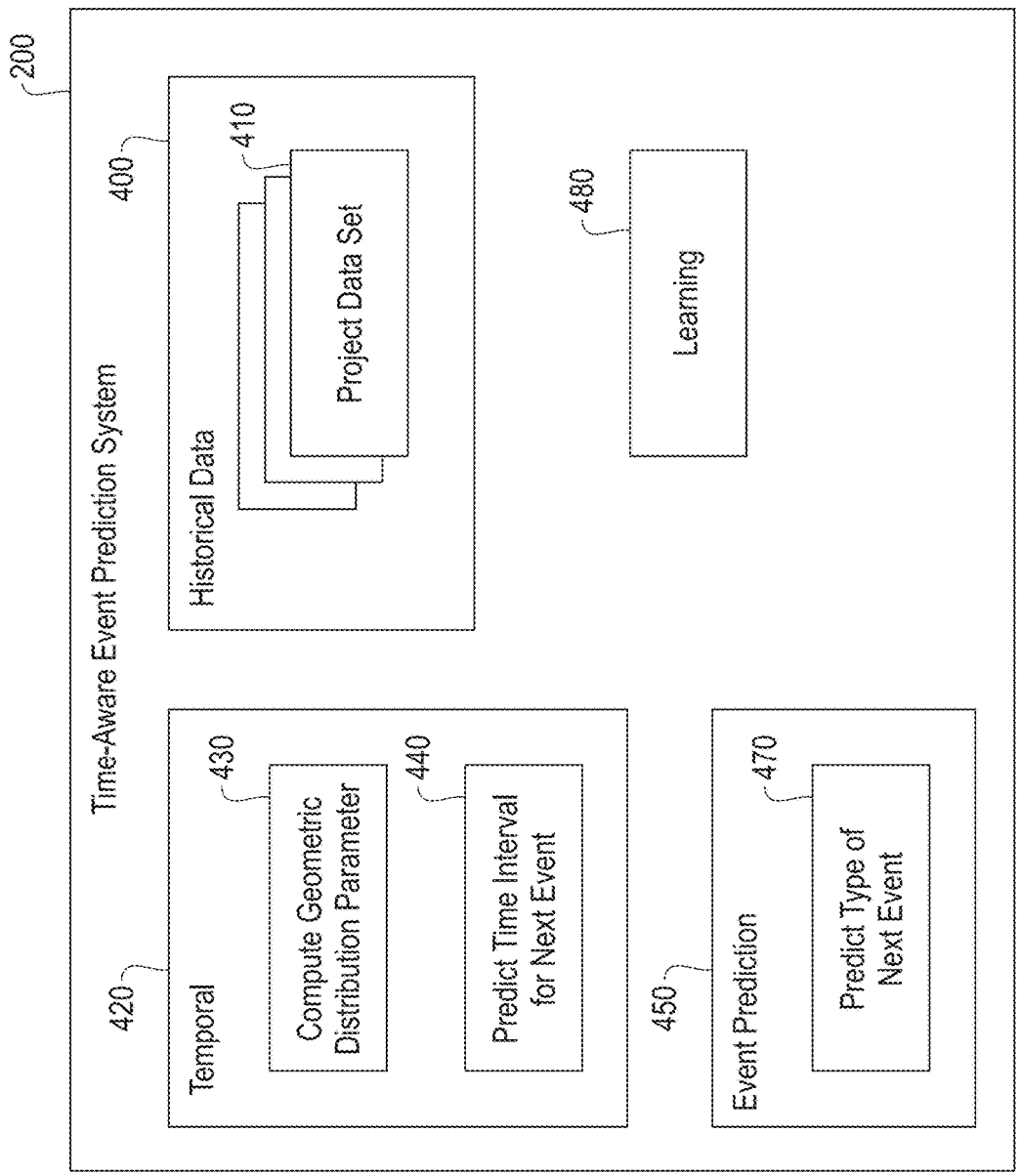
FIG. 2 illustrates the time-aware event prediction system in detail, in accordance with an embodiment of the invention.

FIG. 2 illustrates the time-aware event prediction system 200 in detail, in accordance with an embodiment of the invention. In one embodiment, the storage devices 220 (FIG. 1) maintains at least one database 400 maintaining historical data for past projects. In one example implementation, the historical data includes a collection of project data sets 410. Each project data set 410 corresponds to a project, and comprises observed data for the project, such as key events and milestones that have occurred during a lifecycle of the project, and a final outcome (e.g., win or loss) of the project.

In one embodiment, the system 200 is implemented based on the following observations from the observed data for past projects: (1) the distribution/frequency of time intervals for the occurrence of key events and milestones decays/decreases exponentially with elapsed time, suggesting that a Geometric distribution may be used to model distribution of such time intervals, (2) the probability of an unsuccessful final outcome (i.e., a loss) is positively correlated with elapsed time, and (3) as different project attributes (e.g., client, size of deal, etc.) differ in progress speed as well as loss probability, the corresponding model parameters should be differentiated as such.

In this specification, let the term "project event" denote an event occurring during a lifecycle of a project. A project event may be one of the following: (1) a final outcome that occurs at the end of a lifecycle of the project, or (2) a key event or milestone occurring before the final outcome of the project.

The time-aware event prediction system 200 further comprises a temporal module 420 configured to model distribution of time intervals for the occurrence of project events. In one embodiment, the temporal module 420 utilizes a Geometric distribution for predicting time intervals for the occurrence of project events, the Geometric distribution representing repeated Bernoulli trials until success. For each unit of time (e.g., day, week, etc.), the temporal module 420 assumes that the occurrence of a project event for a project is a random process controlled by a Bernoulli parameter that is based on one or more project attributes for the project. As described in detail later herein, the temporal module 420 identifies the probability of the occurrence of a particular project event, thereby providing insight into the progress speed of a project (e.g., number of milestones achieved, number of meetings held with potential client, etc.).

In one embodiment, each project event is one of the following event types: (1) a win event representing a successful final outcome for a project (e.g., an IT service provider wins an IT service deal for a particular client), (2) a loss event representing an unsuccessful final outcome for the project (e.g., an IT service provider loses an IT service deal for a particular client), or (3) an update event representing an intermediate key event or milestone that is necessary for the project to progress and that occurs before the final outcome of the project.

Embodiments of the invention are not limited to the event types described above. While different types of individual key events or milestones may be generally classified as update events in one embodiment, other embodiments of the invention may support different types of intermediate key events or milestones given sufficient data.

The time-aware event prediction system 200 further comprises an event prediction module 450 configured to model distribution of event types for project events. In one embodiment, the event prediction module 450 utilizes a Dirichlet process with Dirichlet process parameters for different event types to predict the probability of occurrence of different event types. The Dirichlet process parameters are based on a current status of a project. Furthermore, Dirichlet process parameter for a loss event is positively correlated with elapsed time.

In one embodiment, the time-aware event prediction system 200 further comprises a learning unit 480 configured to map project attributes for past projects to Dirichlet process parameters of a Dirichlet process that models distribution of event types for project events, and a best parameter of a Geometric distribution that models distribution of time intervals for the occurrence of project events. Specifically, the learning unit 480 applies machine learning to the observed data for past projects to learn each of the following: (1) weights of project attributes that are used to compute a best parameter of a Geometric distribution that models distribution of time intervals for the occurrence of project events, and (2) weights of project attributes that are used to compute Dirichlet process parameters of a Dirichlet process that models distribution of event types for project events.

Table 1 below provides a listing identifying different parameters referenced in this specification.

TABLE 1

| Parameters | Definition |
|---|---|
| t | Time interval for a next (i.e., upcoming) project event (i.e., time difference between two time stamps for the latest two project events) |
| s | Event type of a next project event |
| X | Attributes vector representing different projects attributes of a project |
| i | Index |
| U | Update event |
| V | Win event |
| L | Loss event |
| p | Bernoulli parameter |
| $w_p$ | Parameter for determining Bernoulli parameter p |
| $w_u$ | Dirichlet process parameter for update event |
| $w_v$ | Dirichlet process parameter for win event |
| $w_l$ | Dirichlet process parameter for loss event |
| D | A log comprising a collection of log entries |
| α | Probability vector representing probabilities of occurrence of different event types |

Figure 3:
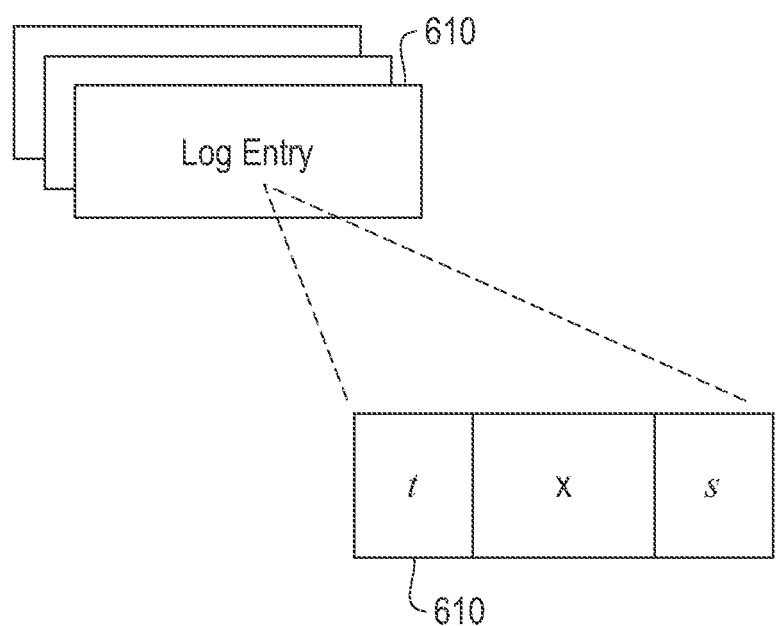
FIG. 3 illustrates an example project data set, in accordance with an embodiment of the invention.

FIG. 3 illustrates an example project data set 410, in accordance with an embodiment of the invention. A project data set 410 corresponds to a past project or an ongoing project (i.e., a final outcome of a project has yet to occur). In one embodiment, a project data set 410 is a log for a project comprising a collection of log entries 610, wherein each log entry 610 corresponds to a project event that has occurred during a lifecycle of the project.

In one embodiment, each log entry 610 is denoted by a trinary tuple ⟨t, X, s⟩.

Figure 4:
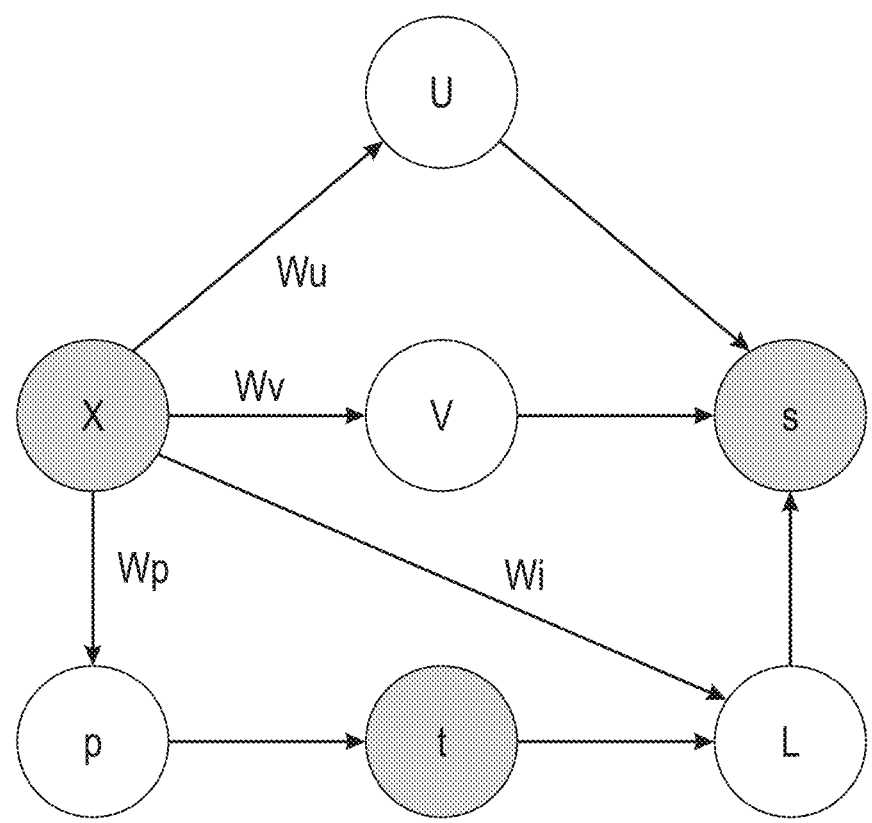
FIG. 4 is a diagram illustrating example flow of data generation by the time-aware event prediction system, in accordance with an embodiment of the invention.

FIG. 4 is a diagram 700 illustrating example flow of data generation by the time-aware event prediction system 200, in accordance with an embodiment of the invention. The system 200 predicts information relating to a next project event for an ongoing project utilizing the Dirichlet process and the Geometric distribution in a pipelined fashion. The predicted information relating to the next project event comprises information relating to an event type of the next project event, and information relating to a time interval for the next project event. In one embodiment, the information relating to an event type of the next project event comprises a probability distribution for a set of possible event types for the next project event. In one embodiment, the information relating to a time interval for the next project event comprises, for each possible event type of the set of possible event types, a corresponding probability distribution for time intervals of occurrence of the possible event type.

Table 2 below provides example process implemented by the system 200 in determining a time interval t and an event type s for a next project event.

TABLE 2

1: p: {X , $w_p$}
2: t ← 1
3: while random number r ∈ [0,1]: r ≤ p do
4:     t ← t + 1

TABLE 2-continued

5: end while
6: (U , V , L ) ~ { X , $w_u$, $w_v$, $w_l$, t }
7: s: {U ,V ,L}

As illustrated by lines 3-5 in Table 2, the temporal module 420 implements a while loop to determine the time interval t. The while loop simulates a repeated Bernoulli trial with a failure probability p. For each failed Bernoulli trial, the time interval t is incremented by 1, suggesting that there are no project events occurring during the time interval t. When the while loop ends, the event prediction module 450 applies the Dirichlet process with the estimated Dirichlet process parameters $w_u$, $w_v$, and $w_l$ to estimate the event type s of the next project event.

As described in detail later herein, in one embodiment, the learning unit 480 randomly assigns a value to the parameter $w_p$, and applies machine learning to the observed data for past projects to learn weights of project attributes that are used to compute the optimal parameter $w_p$. The temporal module 420 computes the Bernoulli parameter p based on the vector X and the parameter $w_p$.

In one embodiment, the temporal module 420 comprises a unit 430 (FIG. 2) configured to compute the Bernoulli parameter p in accordance with the equation (1) provided below:

$$p = sig(w_p^T \Phi(X)) = \frac{1}{1+e^{-w_p^T \Phi(X)}}, \quad (1)$$

wherein $w_p^T$ denotes the transpose of the parameter $w_p$, wherein sig(•) denotes the sigmoid function, wherein Φ(•) denotes a feature transformation process, and wherein the Bernoulli parameter p∈[0,1].

For a Bernoulli parameter p, a probability P(t|p) of time interval t may be computed in accordance with equation (2) provided below:

$$P(t|p)=p^{t-1}(1-p) \quad (2),$$

wherein each trial within the time interval t is a failed Bernoulli trial with exception of the last trial.

Using the Bernoulli parameter p, the temporal module 420 comprises a unit 440 (FIG. 2) configured to estimate the time interval t of the next project event. The time interval t satisfies a Geometric distribution.

In one embodiment, a log probability log P(D|$w_p$) of time intervals in the collection of log entries D may be represented as in equation (3) provided below:

$$\log P(D|w_p) = \log \prod_{i=1}^{|D|} (1-sig(w_p^T X_i))(sig(w_p^T X_i))^{t_i-1}. \quad (3)$$

As described in detail later herein, in one embodiment, the learning unit 480 assigns initial values to the Dirichlet process parameters $w_u$, $w_v$, and $w_l$, and applies machine learning to the observed data for past projects to learn weights of project attributes that are used to compute the optimal Dirichlet process parameters $w_u$, $w_v$, and $w_l$. The event prediction module 450 applies the Dirichlet process with the Dirichlet process parameters $w_u$, $w_v$, and $w_l$ and the attributes vector X to estimate, for each event type (e.g., win, loss and update), a probability that the event type is the next project event to occur.

In one embodiment, the appearance of an event type is random and is determined by a probability vector $\alpha$. The probability vector $\alpha$ is a k-dimensional vector, wherein k is equal to the total number of different event types. For example, if there are three different event types in total (e.g., win event, loss event and update event), then k=3.

Let $\alpha(j)$ generally denote an element of the probability vector $\alpha$. Each element $\alpha(j)$ has a corresponding event type. Each element $\alpha(j)$ represents a probability that a corresponding event type is a next project event to occur, wherein $\alpha(j) \in [0,1]$. The higher the value of $\alpha(j)$, the higher the probability that a corresponding event type is a next project event to occur. As two different event types cannot occur at the same time, the total sum of each element of the probability vector $\alpha$ is 1 (i.e., $\Sigma_j \alpha(j)=1$).

In one embodiment, the Dirichlet process defines a probability density function for any probability vector. The event prediction module 450 applies a Dirichlet process to model exclusive event types. For a k-dimensional probability vector $\alpha$, there are k Dirichlet non-negative parameters. For example, for a 3-dimensional probability vector $\alpha$ comprising probabilities of occurrence for a win event, a loss event and an update event, there are three Dirichlet non-negative parameters: (1) $w_u$ for an update event, (2) $w_v$ for a win event, and (3) $w_l$ for a loss event.

In one embodiment, for a 3-dimensional probability vector $\alpha$ comprising probabilities of occurrence for a win event, a loss event and an update event, the probability vector $\alpha$ may be represented as in equation (4) provided below:

$$Dir(\alpha \mid U, V, L) = \frac{1}{B(U, V, L)} \alpha_u^{U-1} \alpha_v^{V-1} \alpha_l^{L-1}, \quad (4)$$

wherein B(•) denotes a Beta function that provides a normalization constant. The Beta function B(•) may be defined in accordance with equation (5) provided below:

$$B(U, V, L) = \frac{\Gamma(U)\Gamma(V)\Gamma(L)}{\Gamma(U+V+L)} \quad (5)$$

$$\Gamma(x) = \int_0^\infty x^{t-1} e^{-x} dx.$$

The event prediction module 450 comprises a unit 470 (FIG. 2) configured to compute a probability of occurrence of an event type s in accordance with equation (6) provided below:

$$P(s \mid U, V, L) = \int_\alpha P(s, \alpha \mid U, V, L) d\alpha \quad (6)$$

$$= \frac{U^{1_{s=u}} V^{1_{s=v}} L^{1_{s=l}}}{U+V+L},$$

wherein $$1_{condition} = \begin{cases} 1 & \text{if "condition" is true} \\ 0 & \text{otherwise} \end{cases} \quad (7)$$

In one embodiment, an update event U is defined in accordance with equation (8) provided below:

$$U = e^{w_u^T X} \quad (8)$$

wherein U is a non-negative value.

In one embodiment, a win event V is defined in accordance with equation (9) provided below:

$$V = e^{w_v^T X} \quad (9),$$

wherein V is a non-negative value.

As stated above, the probability of an unsuccessful final outcome (i.e., a loss event) is positively correlated with elapsed time. Therefore, a loss event is affected by the time interval t and the Dirichlet process parameters $w_l$. In one embodiment, a loss event L is defined in accordance with equation (10) provided below:

$$L = t \cdot e^{w_l^T X} \quad (10),$$

wherein L is a non-negative value.

Given the collection of log entries D, a log-likelihood may be represented in accordance with equation (11) provided below:

$$\log P(D \mid w_u, w_v, w_l) = \log \prod_{i=1}^{|D|} \frac{e^{w_u^T X_i s_i^u} \cdot e^{w_v^T X_i s_i^v} \cdot t_i e^{w_l^T X_i s_i^l}}{e^{w_u^T X_i} + e^{w_v^T X_i} + t_i e^{w_l^T X_i}}. \quad (11)$$

Let P(s,t|X,w) denote a probability that an event type may occur at a specific time t. In one embodiment, the probability P(s,t|X,w) may be computed in accordance with equation (12) provided below:

$$P(s,t|X,w) = P(t|p=sig(w_p^T X)) \cdot P(s|U=e^{w_u^T X}, V=e^{w_v^T X}, L=t \cdot e^{w_l^T X}) \quad (12),$$

wherein the right-hand side (RHS) of equation (12) comprises two parts: the Geometric distribution as computed in equations (1) and (2), and the Dirichlet distribution as computed in equation (6).

Let $P(s, t \leq T | X, w)$ denote a probability that an event type may occur within a time interval T. In one embodiment, the probability $P(s, t \leq T | X, w)$ may be computed in accordance with equation (13) provided below:

$$P(s, t \leq T \mid X, w) = \sum_{t=1}^{T} P(s, t \mid X, w), \quad (13)$$

In one embodiment, a time t* is selected that maximizes the probability P(s,t|X,w).

In another embodiment, a probability threshold is learned to determine whether there would be an event or not. For a specific threshold $\delta \in [0,1]$, if the Bernoulli failure trial probability (i.e., failure event probability) is smaller than the threshold $p^t \leq \delta$, we may consider that something should happen. That is, the time threshold $$t^* = \log_p \delta = \frac{\log \delta}{\log p}.$$

Given the collection of log entries D, log entries with update events and win events are selected, and an objective function representing the squared difference between the time threshold t* and the real time $t_i$ is defined in accordance with equation (14) provided below:

$$L_t(\delta) = \sum_{i=1}^{|D|} \left(\frac{\log\delta}{\log p_i} - t_i\right)^2, \quad (14)$$

wherein $p_i = \text{sig}(w_p^T X)$.

Let $\delta^*$ denote an optimal probability threshold. In one embodiment, the optimal probability threshold $\delta^*$ is computed by minimizing equation (14), as computed in accordance with equation (15) provided below:

$$\delta^* = \arg\min_\delta L_t(\delta) = \frac{\sum_{i=1}^{|D|} \frac{t_i}{\log p_i}}{\sum_{i=1}^{|D|} \left(\frac{1}{\log p_i}\right)^2}. \quad (15)$$

Let $\eta$ denote another probability threshold that distinguishes a loss event from others. Given a probability threshold $\eta \in [0,1]$, the corresponding time threshold $t$ for a loss event may be computed in accordance with equation (16) provided below:

$$t \geq \frac{e^{w_u^T X} + e^{w_v^T X}}{e^{w_l^T X}} \cdot \frac{\eta}{1-\eta}. \quad (16)$$

After selecting log entries with loss events from the collection of log entries D, an objective function representing the squared difference between the probability threshold $\eta$ and the real time $t_i$ for a loss event is defined in accordance with equation (17) provided below:

$$L_{t'}(\eta) = \sum_{i=1}^{|D|} \left(\frac{e^{w_u^T X_i} + e^{w_v^T X_i}}{e^{w_l^T X_i}} \cdot \frac{\eta}{1-\eta} - t_i\right)^2. \quad (17)$$

Let $\eta^*$ denote an optimal probability threshold. In one embodiment, the optimal probability threshold $\eta^*$ is computed by minimizing equation (17), as computed in accordance with equation (18) provided below:

$$\eta^* = \arg\min_\eta L_{t'}(\eta) = \frac{\Delta}{1+\Delta} \quad (18)$$

$$\Delta = \frac{\sum_{i=1}^{|D|} t_i \cdot \frac{e^{w_u^T X_i} + e^{w_v^T X_i}}{e^{w_l^T X_i}}}{\sum_{i=1}^{|D|} \frac{e^{w_u^T X_i} + e^{w_v^T X_i}}{e^{w_l^T X_i}}}.$$

Let $\hat{t}_i$ denote an estimated time interval. In one embodiment, the estimated time interval $\hat{t}_i$ is defined in accordance with equation (19) provided below:

$$\hat{t}_i = \min\left\{\frac{\log\delta^*}{\log\text{sig}(w_p^T X_i)}, \frac{e^{w_u^T X_i} + e^{w_v^T X}}{e^{w_l^T X_i}} \cdot \frac{\eta^*}{1-\eta^*}\right\}. \quad (19)$$

Figure 5:
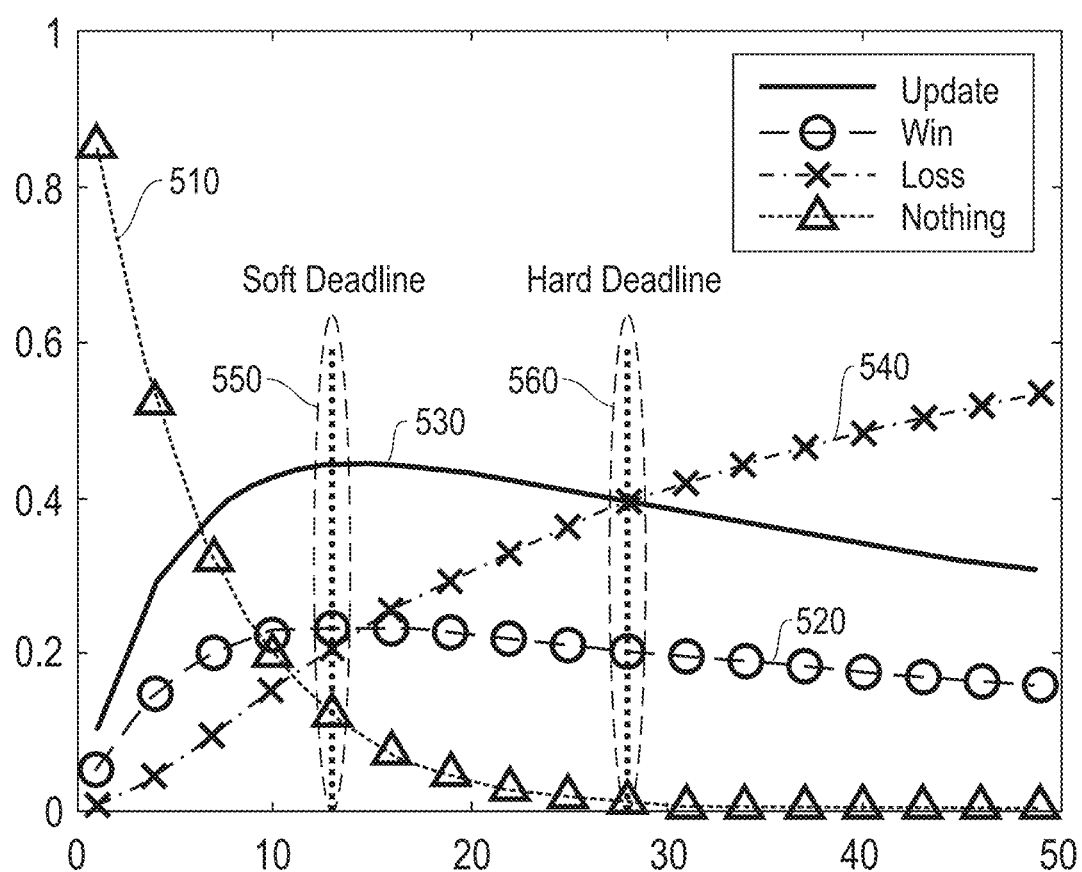
FIG. 5 is a graph illustrating example output of the time-aware event prediction system 200, in accordance with an embodiment of the invention.

FIG. 5 is a graph 500 illustrating example output of the time-aware event prediction system 200, in accordance with an embodiment of the invention. The x-axis of the graph 500 represents time units, and the y-axis of the graph 500 represents probability. Based on one or more projects attributes for a project, the system 200 estimates probability of different event types occurring during a lifecycle of the project, as well as time intervals for the event types. For example, as shown in FIG. 5, a first curve 510 represents probability of occurrence of no project event (i.e., nothing happens); the first curve 510 decays exponentially over time. A second curve 520 represents probability of occurrence of a win event. A third curve 530 represents probability of occurrence of an update event. As shown by the second curve 520 and the third curve 530, the system 200 estimates that an update event is more likely to occur before a win event. A fourth curve 540 represents probability of occurrence of a loss event; the probability of a loss event increases as time goes by.

The graph 500 also provides temporal estimations that may be used as a guide for maintaining progress of the project. For example, as shown in FIG. 5, a first time interval 550 represents a soft deadline for an update in the project. A second time interval 560 represents a hard deadline for an update in the project; if the update does not occur by the hard deadline, a loss is expected as the final outcome for the project.

FIG. 6 illustrates a flowchart of an example process 600 for predicting occurrence, time and type of key events and milestones within an ongoing project to assist in monitoring the progress of the project, in accordance with an embodiment of the present invention. In process block 601, map project attributes for past projects to a first parameter set associated with a first model (e.g., Dirichlet process) that models distribution of event types of project events and a second parameter set associated with a second model (e.g., a Geometric distribution) that models distribution of time intervals of project events by applying machine learning to a set of historical data for the past projects to obtain a first set of learned weights and a second set of learned weights.

Process blocks 602-605 relate to predicting information relating to a next project event for an ongoing project. Specifically, in process block 602, compute the first parameter set based on project attributes for the ongoing project and the first set of learned weights. In process block 603, based on the first model and the first parameter set, predict an event type of the next project event as a probability distribution for a set of possible event types for the next project event. In process block 604, compute the second parameter set based on the project attributes for the ongoing project and the second set of learned weights. In process block 605, based on the second model and the second parameter set, estimate a time interval of occurrence of the next project event as probability distributions for time intervals of occurrence of the set of possible event types.

In one embodiment, process blocks 601-605 may be performed by one or more components of the time-aware event prediction system 200.

Figure 7:
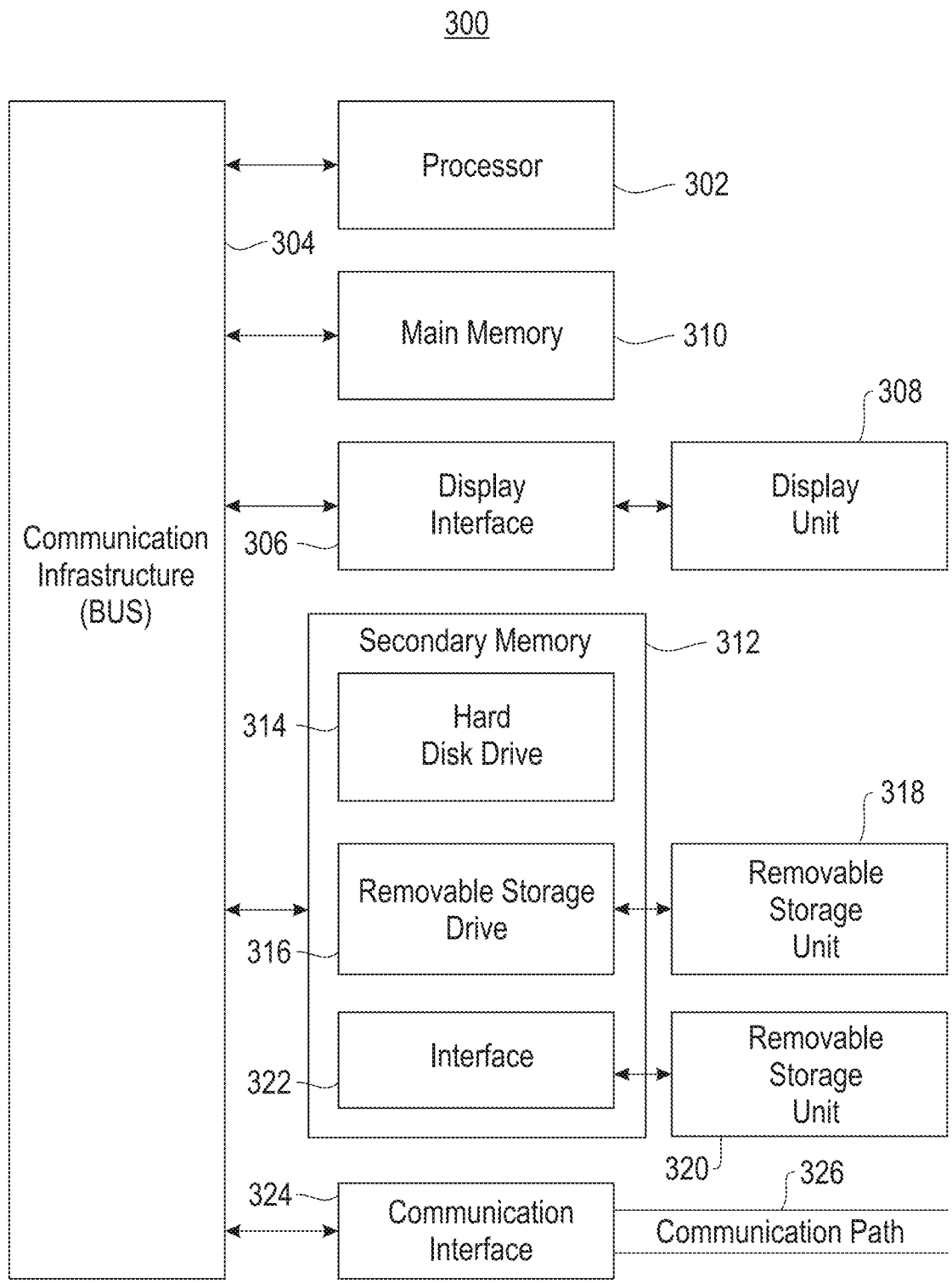
FIG. 7 is a high level block diagram showing an information processing system useful for implementing one embodiment of the invention.

FIG. 7 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    training at least one time-aware predictive analytics model to predict time interval of occurrence and event type of one or more project events during a lifecycle of an IT service deal by:
        mapping project attributes for one or more past IT service deals to a first parameter set associated with a first model that models distribution of event types of one or more project events that occurred during a lifecycle of the one or more past IT service deals by applying machine learning to a set of historical data for the one or more past IT service deals to obtain a first set of learned weights, wherein the set of historical data comprises, for each of the one or more past IT service deals, an attributes vector corresponding to the past IT service deal that includes one project attribute indicative of a client of the past IT service deal and another project attribute indicative of a size of the past IT service deal; and
        mapping the project attributes to a second parameter set associated with a second model that models distribution of time intervals of the one or more project events by applying machine learning to the set of historical data to obtain a second set of learned weights, wherein the second model is trained to estimate a time interval of occurrence of a project event based on the second set of learned weights; and
    improving a likelihood of a service provider closing an ongoing IT service deal with a potential client by:
        monitoring progress of the ongoing IT service deal by predicting time interval of occurrence and event type of a key project event during a lifecycle of the ongoing IT service deal utilizing the at least one time-aware predictive analytics model, wherein the key project event represents an intermediate milestone that is necessary to maintain the progress of the ongoing IT service deal and that must occur before the service provider closes the ongoing IT service deal, and the predicting comprises:
            predicting the event type of the key project event by generating a first probability distribution for a set of possible event types for the key project event utilizing an attributes vector corresponding to the ongoing IT service deal, the first model, and the first parameter set, wherein the attributes vector corresponding to the ongoing IT service deal includes one project attribute indicative of the potential client and another project attribute indicative of a size of the ongoing IT service deal; and predicting the time interval of occurrence of the key project event by, for each possible event type of the set of possible event types, generating a corresponding probability distribution for time intervals of occurrence of the possible event type utilizing the attributes vector corresponding to the ongoing IT service deal, the second model, and the second parameter set; and based on the time interval of occurrence and the event type of the key project event, generating an output comprising a probability of occurrence of the key project event over the lifecycle of the ongoing IT service deal, a probability of occurrence of the service provider closing the ongoing IT service deal over the lifecycle of the ongoing IT service deal, a probability of occurrence of the service provider losing the ongoing IT service deal over the lifecycle of the ongoing IT service deal, a first temporal estimation indicative of a soft deadline for the key project event, and a second temporal estimation indicative of a hard deadline for the key project event, wherein the probability of occurrence of the service provider closing the ongoing IT service deal is highest if the key project event occurs at the soft deadline, the output illustrates a timeframe between the soft deadline and the hard deadline during which the probability of occurrence of the service provider losing the ongoing IT service deal exceeds the probability of occurrence of the service provider closing the ongoing IT service deal, and the hard deadline is a final deadline by which the key project event must occur to maintain the progress of the ongoing IT service deal.

2. The method of claim 1, wherein the predicting further comprises:

computing the first parameter set based on the attributes vector corresponding to the ongoing IT service deal and the first set of learned weights;

based on the first model and the first parameter set, predicting the event type of the key project event as the first probability distribution for the set of possible event types;

computing the second parameter set based on the attributes vector corresponding to the ongoing IT service deal and the second set of learned weights;

computing a set of probabilities based on the attributes vector corresponding to the ongoing IT service deal and the first parameter set, wherein the set of probabilities comprises, for each possible event type of the set of possible event types, a corresponding probability representing a likelihood that the key project event is the possible event type; and based on the second model and the second parameter set, estimating the time interval of occurrence of the key project event as probability distributions for time intervals of occurrence of the set of possible event types, wherein each time interval of occurrence represents a given time.

3. The method of claim 2, wherein the second model comprises a Geometric distribution, the second parameter set comprises parameters of the Geometric distribution, and applying machine learning to the set of historical data comprises maximizing log likelihood of time intervals of occurrence of the one or more project events with the Geometric distribution.

4. The method of claim 2, wherein the first model comprises a Dirichlet process, the first parameter set comprises a parameter of the Dirichlet process, and applying machine learning to the set of historical data comprises maximizing log likelihood of the event types of the one or more project events with the Dirichlet process.

5. The method of claim 1, wherein the output further comprises:

a first curve representing a probability that no project event occurs over the lifecycle of the ongoing IT service deal, wherein the first curve decays exponentially over time;

a second curve representing the probability of occurrence of the service provider closing the ongoing IT service deal;

a third curve representing the probability of occurrence of the key project event; and a fourth curve representing the probability of occurrence of the service provider losing the ongoing IT service deal, wherein the probability of occurrence of the service provider losing the ongoing IT service deal increases with time.

6. The method of claim 1, wherein:

the key project event represents one of a presentation of a proposal to the potential client, a meeting with the potential client, or an agreement with the potential client on price and service delivery;

a project event is one of the following: a successful final outcome, an unsuccessful final outcome, and an intermediate milestone; and the first probability distribution for the set of possible event types comprises a first probability representing a first likelihood that the key project event is a successful final outcome, a second probability representing a second likelihood that the key project event is an unsuccessful final outcome, and one or more additional probabilities representing one or more additional likelihoods that the key project event is one or more intermediate milestones.

7. The method of claim 1, wherein:

the output provides a predicted outcome and a predicted timeline for the key project event;

the output illustrates the key project event is more likely to occur before the service provider closing the ongoing IT service deal;

the output illustrates the service provider is expected to lose the ongoing IT service deal if the key project event does not occur by the hard deadline the service provider closing the ongoing IT service deal is a successful final outcome that occurs at an end of the lifecycle of the ongoing IT service deal; and the service provider losing the ongoing IT service deal is an unsuccessful final outcome that occurs at the end of the lifecycle of the ongoing IT service deal.

8. A system comprising a computer processor, a computer-readable hardware storage medium, and program code embodied with the computer-readable hardware storage medium for execution by the computer processor to implement a method comprising:

training at least one time-aware predictive analytics model to predict time interval of occurrence and event type of one or more project events during a lifecycle of an IT service deal by:

mapping project attributes for one or more past IT service deals to a first parameter set associated with a first model that models distribution of event types of one or more project events that occurred during a lifecycle of the one or more past IT service deals by applying machine learning to a set of historical data for the one or more past IT service deals to obtain a first set of learned weights, wherein the set of historical data comprises, for each of the one or more past IT service deals, an attributes vector corresponding to the past IT service deal that includes one project attribute indicative of a client of the past IT service deal and another project attribute indicative of a size of the past IT service deal; and mapping the project attributes to a second parameter set associated with a second model that models distribution of time intervals of the one or more project events by applying machine learning to the set of historical data to obtain a second set of learned weights, wherein the second model is trained to estimate a time interval of the future occurrence of a project event based on the first second set of learned weights; and improving a likelihood of a service provider closing an ongoing IT service deal with a potential client by:

monitoring progress of the ongoing IT service deal by predicting time interval of occurrence and event type of a key project event during a lifecycle of the ongoing IT service deal utilizing the at least one time-aware predictive analytics model, wherein the key project event represents an intermediate milestone that is necessary to maintain the progress of the ongoing IT service deal and that must occur before the service provider closes the ongoing IT service deal, and the predicting comprises:

predicting the event type of the key project event by generating a first probability distribution for a set of possible event types for the key project event utilizing an attributes vector corresponding to the ongoing IT service deal, the first model, and the first parameter set, wherein the attributes vector corresponding to the ongoing IT service deal includes one project attribute indicative of the potential client and another project attribute indicative of a size of the ongoing IT service deal; and predicting the time interval of occurrence of the key project event by, for each possible event type of the set of possible event types, generating a corresponding probability distribution for time intervals of occurrence of the possible event type utilizing the attributes vector corresponding to the ongoing IT service deal, the second model, and the second parameter set; and based on the time interval of occurrence and the event type of the key project event, generating an output comprising a probability of occurrence of the key project event over the lifecycle of the ongoing IT service deal, a probability of occurrence of the service provider closing the ongoing IT service deal over the lifecycle of the ongoing IT service deal, a probability of occurrence of the service provider losing the ongoing IT service deal over the lifecycle of the ongoing IT service deal, a first temporal estimation indicative of a soft deadline for the key project event, and a second temporal estimation indicative of a hard deadline for the key project event, wherein the probability of occurrence of the service provider closing the ongoing IT service deal is highest if the key project event occurs at the soft deadline, the output illustrates a timeframe between the soft deadline and the hard deadline during which the probability of occurrence of the service provider losing the ongoing IT service deal exceeds the probability of occurrence of the service provider closing the ongoing IT service deal, and the hard deadline is a final deadline by which the key project event must occur to maintain the progress of the ongoing IT service deal.

9. The system of claim 8, wherein the predicting comprises:

computing the first parameter set based on the attributes vector corresponding to the ongoing IT service deal and the first set of learned weights;

based on the first model and the first parameter set, predicting the event type of the key project event as the first probability distribution for the set of possible event types;

computing the second parameter set based on the attributes vector corresponding to the ongoing IT service deal and the second set of learned weights;

computing a set of probabilities based on the attributes vector corresponding to the ongoing IT service deal and the first parameter set, wherein the set of probabilities comprises, for each possible event type of the set of possible event types, a corresponding probability representing a likelihood that the key project event is the possible event type; and based on the second model and the second parameter set, estimating the time interval of occurrence of the key project event as probability distributions for time intervals of occurrence of the set of possible event types, wherein each time interval of occurrence represents a given time.

10. The system of claim 9, wherein the second model comprises a Geometric distribution, the second parameter set comprises parameters of the Geometric distribution, and applying machine learning to the set of historical data comprises maximizing log likelihood of time intervals of occurrence of the one or more project events with the Geometric distribution.

11. The system of claim 9, wherein the first model comprises a Dirichlet process, the first parameter set comprises a parameter of the Dirichlet process, and applying machine learning to the set of historical data comprises maximizing log likelihood of the event types of the one or more project events with the Dirichlet process.

12. The system of claim 8, wherein the output further comprises:

a first curve representing a probability that no project event occurs over the lifecycle of the ongoing IT service deal, wherein the first curve decays exponentially over time;

a second curve representing the probability of occurrence of the service provider closing the ongoing IT service deal;

a third curve representing the probability of occurrence of the key project event; and a fourth curve representing the probability of occurrence of the service provider losing the ongoing IT service deal, wherein the probability of occurrence of the service provider losing the ongoing IT service deal increases with time.

13. The system of claim 8, wherein:
the key project event represents one of a presentation of a proposal to the potential client, a meeting with the potential client, or an agreement with the potential client on price and service delivery;
a project event is one of the following: a successful final outcome, an unsuccessful final outcome, and an intermediate milestone; and
the first probability distribution for the set of possible event types comprises a first probability representing a first likelihood that the key project event is a successful final outcome, a second probability representing a second likelihood that the key project event is an unsuccessful final outcome, and one or more additional probabilities representing one or more additional likelihoods that the key project event is one or more intermediate milestones.

14. The system of claim 8, wherein:
the output provides a predicted outcome and a predicted timeline for the key project event;
the output illustrates the key project event is more likely to occur before the service provider closing the ongoing IT service deal;
the output illustrates the service provider is expected to lose the ongoing IT service deal if the key project event does not occur by the hard deadline the service provider closing the ongoing IT service deal is a successful final outcome that occurs at an end of the lifecycle of the ongoing IT service deal; and
the service provider losing the ongoing IT service deal is an unsuccessful final outcome that occurs at the end of the lifecycle of the ongoing IT service deal.

15. A computer program product comprising a computer-readable hardware storage device having program code embodied therewith, the program code being executable by a computer to implement a method comprising:
training at least one time-aware predictive analytics model to predict time interval of occurrence and event type of one or more project events during a lifecycle of an IT service deal by:
mapping project attributes for one or more past IT service deals to a first parameter set associated with a first model that models distribution of event types of one or more project events that occurred during a lifecycle of the one or more past IT service deals by applying machine learning to a set of historical data for the one or more past IT service deals to obtain a first set of learned weights, wherein the set of historical data comprises, for each of the one or more past IT service deals, an attributes vector corresponding to the past IT service deal that includes one project attribute indicative of a client of the past IT service deal and another project attribute indicative of a size of the past IT service deal; and
mapping the project attributes to a second parameter set associated with a second model that models distribution of time intervals of the one or more project events by applying machine learning to the set of historical data to obtain a second set of learned weights, wherein the second model is trained to estimate a time interval of occurrence of a project event based on the second set of learned weights; and
improving a likelihood of a service provider closing an ongoing IT service deal with a potential client by:
monitoring progress of the ongoing IT service deal by predicting time interval of occurrence and event type of a key project event during a lifecycle of the ongoing IT service deal utilizing the at least one time-aware predictive analytics model, wherein the key project event represents an intermediate milestone that is necessary to maintain the progress of the ongoing IT service deal and that must occur before the service provider closes the ongoing IT service deal, and the predicting comprises:
predicting the event type of the key project event by generating a first probability distribution for a set of possible event types for the key project event utilizing an attributes vector corresponding to the ongoing IT service deal, the first model, and the first parameter set, wherein the attributes vector corresponding to the ongoing IT service deal includes one project attribute indicative of the potential client and another project attribute indicative of a size of the ongoing IT service deal; and
predicting the time interval of occurrence of the key project event by, for each possible event type of the set of possible event types, generating a corresponding probability distribution for time intervals of occurrence of the possible event type utilizing the attributes vector corresponding to the ongoing IT service deal, the second model, and the second parameter set; and
based on the time interval of occurrence and the event type of the key project event, generating an output comprising a probability of occurrence of the key project event over the lifecycle of the ongoing IT service deal, a probability of occurrence of the service provider closing the ongoing IT service deal over the lifecycle of the ongoing IT service deal, a probability of occurrence of the service provider losing the ongoing IT service deal over the lifecycle of the ongoing IT service deal, a first temporal estimation indicative of a soft deadline for the key project event, and a second temporal estimation indicative of a hard deadline for the key project event, wherein the probability of occurrence of the service provider closing the ongoing IT service deal is highest if the key project event occurs at the soft deadline, the output illustrates a timeframe between the soft deadline and the hard deadline during which the probability of occurrence of the service provider losing the ongoing IT service deal exceeds the probability of occurrence of the service provider closing the ongoing IT service deal, and the hard deadline is a final deadline by which the key project event must occur to maintain the progress of the ongoing IT service deal.

16. The computer program product of claim 15, wherein the predicting comprises:
computing the first parameter set based on the attributes vector corresponding to the ongoing IT service deal and the first set of learned weights;
based on the first model and the first parameter set, predicting the event type of the key project event as the first probability distribution for the set of possible event types;
computing the second parameter set based on the attributes vector corresponding to the ongoing IT service deal and the second set of learned weights;
computing a set of probabilities based on the attributes vector corresponding to the ongoing IT service deal and the first parameter set, wherein the set of probabilities comprises, for each possible event type of the set of possible event types, a corresponding probability representing a likelihood that the key project event is the possible event type; and based on the second model and the second parameter set, estimating the time interval of occurrence of the key project event as probability distributions for time intervals of occurrence of the set of possible event types, wherein each time interval of occurrence represents a given time.

17. The computer program product of claim 16, wherein the second model comprises a Geometric distribution, the second parameter set comprises parameters of the Geometric distribution, and applying machine learning to the set of historical data comprises maximizing log likelihood of time intervals of occurrence of the one or more project events with the Geometric distribution.

18. The computer program product of claim 16, wherein the first model comprises a Dirichlet process, the first parameter set comprises a parameter of the Dirichlet process, and applying machine learning to the set of historical data comprises maximizing log likelihood of the event types of the one or more project events with the Dirichlet process.

19. The computer program product of claim 15, wherein the output further comprises:

a first curve representing a probability that no project event occurs over the lifecycle of the ongoing IT service deal, wherein the first curve decays exponentially over time;

a second curve representing the probability of occurrence of the service provider closing the ongoing IT service deal;

a third curve representing the probability of occurrence of the key project event; and a fourth curve representing the probability of occurrence of the service provider losing the ongoing IT service deal, wherein the probability of occurrence of the service provider losing the ongoing IT service deal increases with time.

20. The computer program product of claim 15, wherein:

the key project event represents one of a presentation of a proposal to the potential client, a meeting with the potential client, or an agreement with the potential client on price and service delivery;

a project event is one of the following: a successful final outcome, an unsuccessful final outcome, and an intermediate milestone; and the first probability distribution for the set of possible event types comprises a first probability representing a first likelihood that the key project event is a successful final outcome, a second probability representing a second likelihood that the key project event is an unsuccessful final outcome, and one or more additional probabilities representing one or more additional likelihoods that the key project event is one or more intermediate milestones.

* * * * *